(12) United States Patent
Allman et al.

(10) Patent No.: US 10,929,373 B2
(45) Date of Patent: *Feb. 23, 2021

(54) EVENT FAILURE MANAGEMENT

(71) Applicant: International Business Machines Corporation, Armonk, NY (US)

(72) Inventors: Mark Allman, Hedge End (GB); Andrew S. Edwards, Southampton (GB); Philip Jones, Hook (GB); Doina L. Klinger, Winchester (GB); Martin A. Ross, Gosport (GB); Paul S. Thorpe, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,373

(22) Filed: May 7, 2019

(65) Prior Publication Data

US 2019/0258547 A1    Aug. 22, 2019

Related U.S. Application Data

(63) Continuation of application No. 15/461,690, filed on Mar. 17, 2017, now Pat. No. 10,331,522.

(51) Int. Cl.
*G06F 11/00* (2006.01)
*G06F 16/23* (2019.01)
(Continued)

(52) U.S. Cl.
CPC .......... *G06F 16/23* (2019.01); *G06F 11/0709* (2013.01); *G06F 11/079* (2013.01);
(Continued)

(58) Field of Classification Search
CPC ............... G06F 11/008; G06F 11/0751; G06F 11/1469; G06F 11/2023; G06F 11/0793; H04L 41/0631; H04L 41/147; H04L 43/08
See application file for complete search history.

(56) References Cited

U.S. PATENT DOCUMENTS

| | | |
|---|---|---|
| 4,896,261 A | 1/1990 | Nolan |
| 5,673,390 A | 9/1997 | Mueller |
| (Continued) | | |

OTHER PUBLICATIONS

Madgula et al., "Managing Failed Flows Using the Failed Event Manager API in Websphere Process Server", IBM Corporation, developerWorks®, Mar. 2, 2011 (17 pages).

(Continued)

*Primary Examiner* — Loan L. T. Truong
(74) *Attorney, Agent, or Firm* — Heslin Rothenberg Farley & Mesiti P.C.; Michael A. Petrocelli, Esq.

(57) ABSTRACT

A facility for event failure management is provided, which includes providing a failed event database containing failed event information relating to failed events and one or more components associated with each of the failed events. Upon modification to a component associated with a failed event, the failed event is retried. Based on a result of retrying the failed event, failed event information of the failed event database is updated. The failed event database may therefore be dynamically and/or automatically updated so that it contains up-to-date and appropriate information for predicting and/or managing event failures.

15 Claims, 5 Drawing Sheets

(51) Int. Cl.
    *G06F 11/07*         (2006.01)
    *G06F 16/2455*     (2019.01)
    *G06F 11/14*         (2006.01)

(52) U.S. Cl.
    CPC ...... *G06F 11/0787* (2013.01); *G06F 11/0793* (2013.01); *G06F 11/1438* (2013.01); *G06F 16/24568* (2019.01)

(56) References Cited

U.S. PATENT DOCUMENTS

| | | | |
|---|---|---|---|
| 5,916,307 | A | 6/1999 | Piskiel et al. |
| 6,732,123 | B1 | 5/2004 | Moore et al. |
| 7,552,365 | B1 | 6/2009 | Marsh et al. |
| 8,191,135 | B2 | 5/2012 | Chandrasekharan et al. |
| 8,291,264 | B2 | 10/2012 | Scholer et al. |
| 8,375,244 | B2 * | 2/2013 | Bobak ............... G06F 11/1482 709/224 |
| 8,762,777 | B2 * | 6/2014 | Gotoh ............... H04L 41/0631 714/25 |
| 9,031,969 | B2 * | 5/2015 | Iyengar ............... G06F 16/2379 707/764 |
| 9,577,972 | B1 | 2/2017 | Word et al. |
| 9,632,914 | B2 * | 4/2017 | Cheng ............... G06F 11/3644 |
| 10,296,296 | B2 * | 5/2019 | Subramaniyan ......... G06F 8/35 |
| 10,452,467 | B2 * | 10/2019 | Estrada ............... G06F 11/0751 |
| 10,540,259 | B1 * | 1/2020 | Kramer ............... G06F 11/3409 |
| 2005/0060643 | A1 | 3/2005 | Glass et al. |
| 2006/0200500 | A1 * | 9/2006 | Baek ............... G06F 11/1441 |
| 2006/0242708 | A1 | 10/2006 | Oswall et al. |
| 2007/0016676 | A1 | 1/2007 | Breuer et al. |
| 2007/0088970 | A1 * | 4/2007 | Buxton ............... G06F 11/1471 714/2 |
| 2008/0031111 | A1 | 2/2008 | Hwang et al. |
| 2009/0082984 | A1 | 3/2009 | Wakamiya et al. |
| 2009/0327398 | A1 | 12/2009 | Campbell et al. |
| 2010/0071572 | A1 * | 3/2010 | Carroll ............... B30B 9/3007 100/229 A |
| 2011/0154096 | A1 * | 6/2011 | Matov ............... G06F 11/1489 714/2 |
| 2012/0072470 | A1 | 3/2012 | Joseph |
| 2012/0278473 | A1 | 11/2012 | Griffiths |
| 2013/0166638 | A1 | 6/2013 | Theado et al. |
| 2013/0259097 | A1 | 10/2013 | Olgaard et al. |
| 2013/0268743 | A1 | 10/2013 | Waltermann et al. |
| 2014/0040182 | A1 | 2/2014 | Gilder et al. |
| 2015/0309854 | A1 * | 10/2015 | Fradkin ............... G06F 11/079 714/47.3 |
| 2015/0365476 | A1 * | 12/2015 | Genevski ............... H04L 67/325 709/201 |
| 2015/0378807 | A1 * | 12/2015 | Ball ............... G06Q 10/067 714/47.3 |
| 2016/0142369 | A1 * | 5/2016 | Jiang ............... H04L 45/745 709/223 |
| 2016/0254990 | A1 * | 9/2016 | Koktan ............... H04L 45/28 370/218 |
| 2017/0332255 | A1 * | 11/2017 | Gupta ............... H04L 41/0631 |

OTHER PUBLICATIONS

P. Mell, et al. "The NIST Definition of Cloud Computing", NIST Special Publication 800-145, Sep. 2011, Gaithersburg, MD.
Mark Boyd, "How to Succeed at Failure with Microservices", The New Stack, https://thenewstack.io/succeed-failure-microservices/, Aug. 8, 2016 (13 pages).
List of IBM Patents or Patent Applications Treated as Related, May 21, 2019, 2 pages.

* cited by examiner

EVENT FAILURE MANAGEMENT

BACKGROUND

The present invention relates to the field of managing failures of events, such as events in distributed processing environments.

Distributed processing systems and applications typically need to be scalable so as to cater a large number of applications running at one time (and thus the associated large workload). Such systems and applications are usually monitored in the context of an event management process which typically aims to detect failures of events (i.e. event failures) as early as possible.

Normally, information about a failure of an event (e.g. failure notifications) will be communicated to a service operator of a Failed Event Manager (FEM) so as to be recorded (in a database for example). Such information may be analyzed in an attempt to identify failure patterns for specific components and/or applications and to predict failures before they occur.

SUMMARY

According to an embodiment of the present invention there is provided computer-implemented method for event failure management. The method includes providing a failed event database including failed event information relating to failed events and one or more components associated with each of the failed events. Upon modification to a component associated with a failed event, the failed event is retried. Based on a result of retrying the failed event, failed event information of the failed event database is updated.

Computer program products and systems relating to one or more aspects are also described and claimed herein. Further, services relating to one or more aspects may also be described and claimed herein.

Additional features and advantages are realized through the techniques disclosed herein. Other embodiments and aspects of the invention are described in detail herein, and are considered a part of the claimed aspects.

BRIEF DESCRIPTION OF THE DRAWINGS

Embodiments of the present invention are described herein, by way of example only, with reference to the drawings, in which.

DETAILED DESCRIPTION

Note that the figures presented are merely schematic, and are not drawn to scale. It should also be understood that the same reference numerals used throughout different figures indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (event failure management or prediction) system may be a single device or a collection of distributed devices that are adapted to execute one or more aspects of the methods of the present invention. For instance, a system may be a personal computer (PC), a server or a collection of PCs and/or servers connected via a network such as a local area network, the Internet and so on, to cooperatively execute at least one aspect of the methods of the present invention.

The present invention provides a method for predicting or managing event failures that can provide support for invoking applications or services in scalable service architectures.

The present invention further provides a computer program product including computer program code for implementing the method when executed on a processor of a data processing system. The present invention yet further provides a processing system adapted to execute this computer program code.

In one or more aspects, disclosed herein is an updating and/or maintaining of information in a database relating to event failures. Such updating or maintenance may be automatically undertaken when a component or resource is changed, modified or updated. By retrying a previously failed event when a component or resource changes, embodiments may identify if the change of component or resources affects the outcome of the event and, if the outcome changes (e.g. the previously failed event no longer fails), the information of the database may be updated. In this way, one or more embodiments may enable a database relating to event failures to be dynamically updated, thereby ensuring that it contains up-to-date and appropriate information for predicting and/or managing event failures. Embodiments may therefore predict success of an event (due to altered components/resources for example) that may otherwise be predicted to fail (and thus prevented from executing). Such embodiments may thus avoid unnecessarily preventing or delaying of the execution/processing of messages, applications or services.

By identifying when a component or resource changes and then retrying a failed event, one or more embodiments may identify when components or resources responsible for failed events have been corrected or resolved. Unlike conventional queue or event managers, the embodiments disclosed herein enable information of a database relating to event failures to be automatically maintained so as to reflect changes in components or resources.

One or more embodiments may therefore avoid a failed event database from being 'out-of-date' or inaccurate until updated by an administrator.

Illustrative embodiments may therefore provide an analyzing of available components and on automatically retrying of failed events when available components changes so as to determine if the change resolves the failed event. Dynamic failed event database management/optimization is therefore provided herein.

One or more embodiments may be at least partly based on the realization that changes in components may impact previously failed events and so such failed events may be retried (e.g. tested) to see if information about failed events should be updated. This may facilitate guaranteeing that information about failed events (e.g., a failed event database) contains accurate and up-to-date information.

One or more embodiments may employ an associating of one or more components or resources with failed events so as to provide failed event information relating to failed events. When a component or resource associated with a failed event is altered in some way (e.g. modified, deleted, change, moved, reallocated, etc.), the failed event(s) associated with the component or resource may be retried (e.g. attempted, re-processed, re-executed) to see if it fails or succeeds. If the retried event does not fail (i.e. results in event success), the failed event information may be updated so as to reflect the finding that the event no longer fails as a result of the change in the component or resource.

According to one or more embodiments of the present invention, there is provided a computer program product for event failure management. The computer program product includes a computer readable storage medium having program instructions embodied therewith, the program instructions being executable by a processing unit to cause the processing unit to perform a method according to one or more proposed embodiments when executed on at least one processor of a data processing system.

According to yet another aspect, there is provided a processing system including at least one processor and the computer program product according to one or more embodiments. The at least one processor is adapted to execute the computer program code of the computer program product.

According to yet another aspect, there is provided a system for event failure management. The system includes a failed event database including failed event information relating to failed events and one or more components associated with each of the failed events. The system also includes a processing unit adapted to, upon modification to a component associated with a failed event, retry the failed event. The system also includes a data modification unit adapted to update failed event information of the failed event database based on a result of retrying the failed event.

In one or more implementations, the system may be adapted to implement a failed event manager service in a cloud environment. In one or more other embodiments, the system is adapted to implement a part of a micro-service-oriented architecture. In one or more implementations, the system may further include a database analysis unit adapted to analyze the failed event database to identify a relationship between failed events, and a message handling unit adapted to analyze a message for causing a called event based on the identified relationship to determine an indicator of expected failure of the called event, and the handle the message based on the determined indicator of expected failure.

Many different ways to determine a change in component or resource may be employed in one or more embodiments, and these may be implemented in isolation or in combination. Modifications and additional steps to a traditional message processing systems may also be proposed which may enhance the value and utility of the aspects disclosed herein.

Illustrative embodiments may be utilized in many different types of event processing environments. Illustrative embodiments may, for example, be employed in relation to stateless and scalable cloud-based applications for event processing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
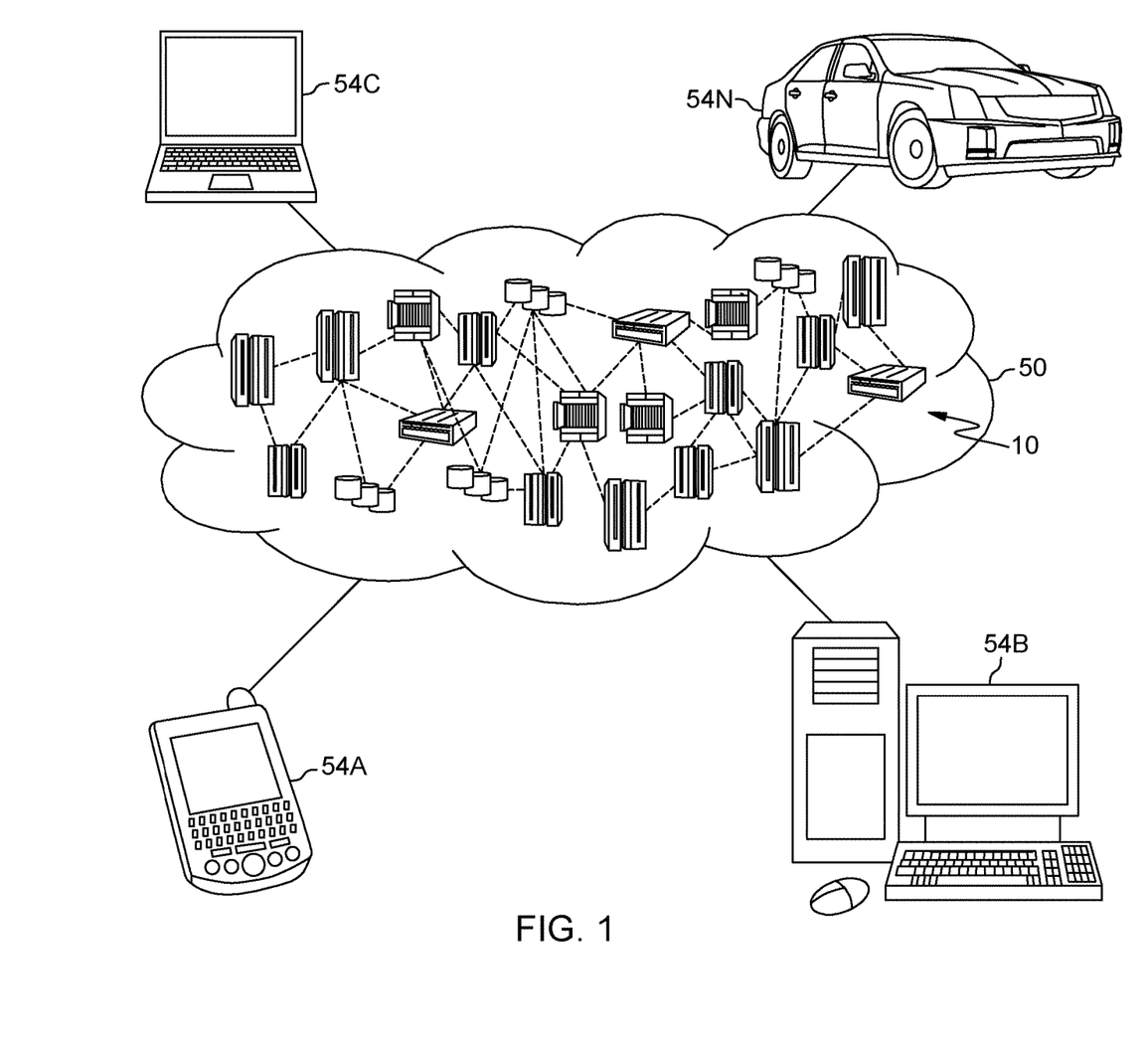
FIG. 1 depicts a cloud computing environment which may facilitate event failure management, according to one or more aspects of the present invention.

Referring to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
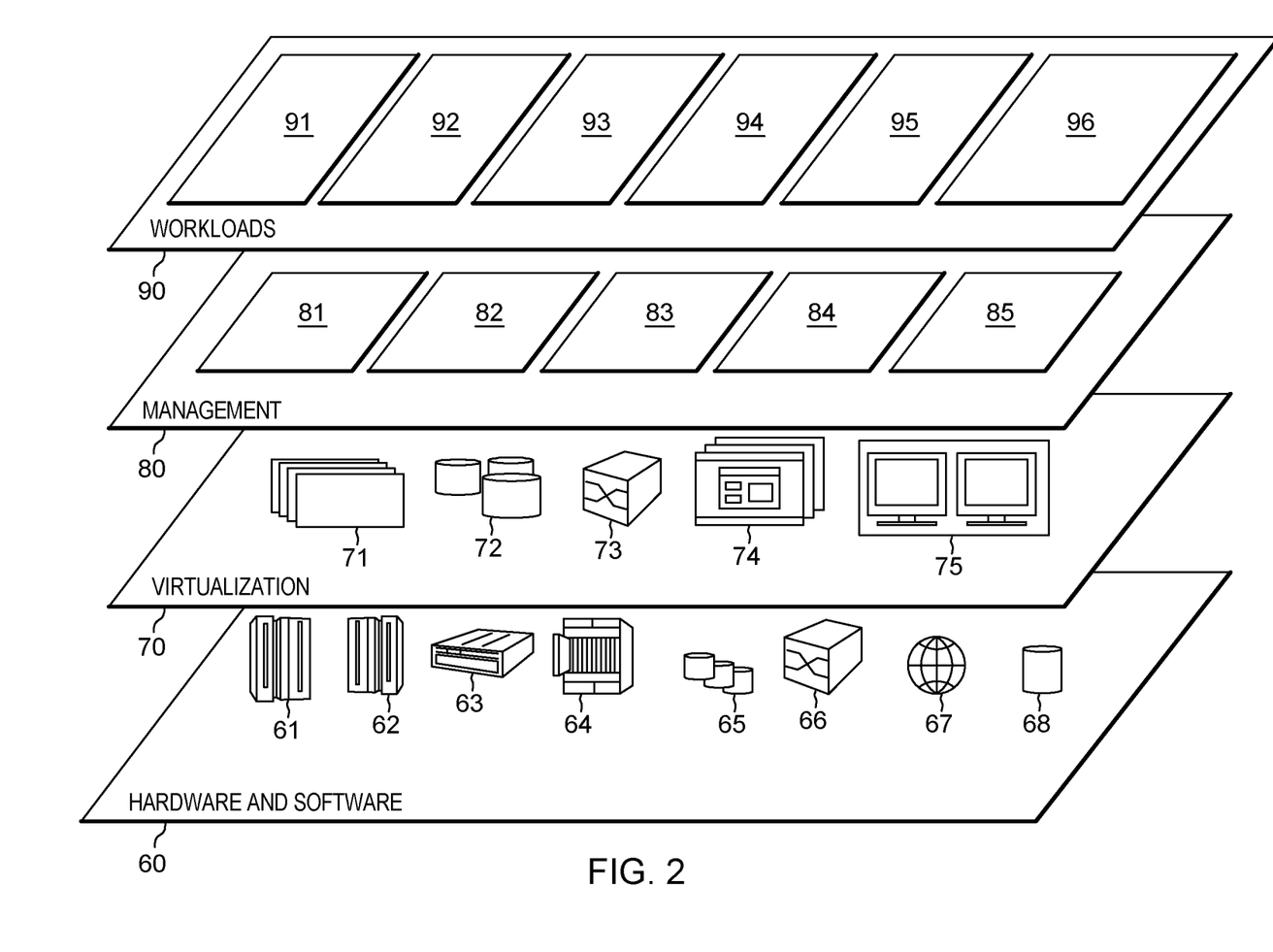
FIG. 2 depicts abstraction model layers, which may facilitate implementing event failure management, according to one or more aspects of the present invention.

Referring next to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions noted below may be provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Event failure prediction and/or management 85 provides event failure prediction and/or management according to proposed embodiments.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and event failure management processing 96.

In one or more aspects, an event processing system is provided which automatically maintains failed event information so as to reflect changes in available resources or components. One or more embodiments may enable a failed event database to keep up-to-date with changes in resources or components associated with previously failed events and then used to avoid unnecessarily preventing events from being executed. Such proposals can extend or improve the processing capabilities or efficiency of a Failed Event Manager (FEM) application/component.

Figure 3:
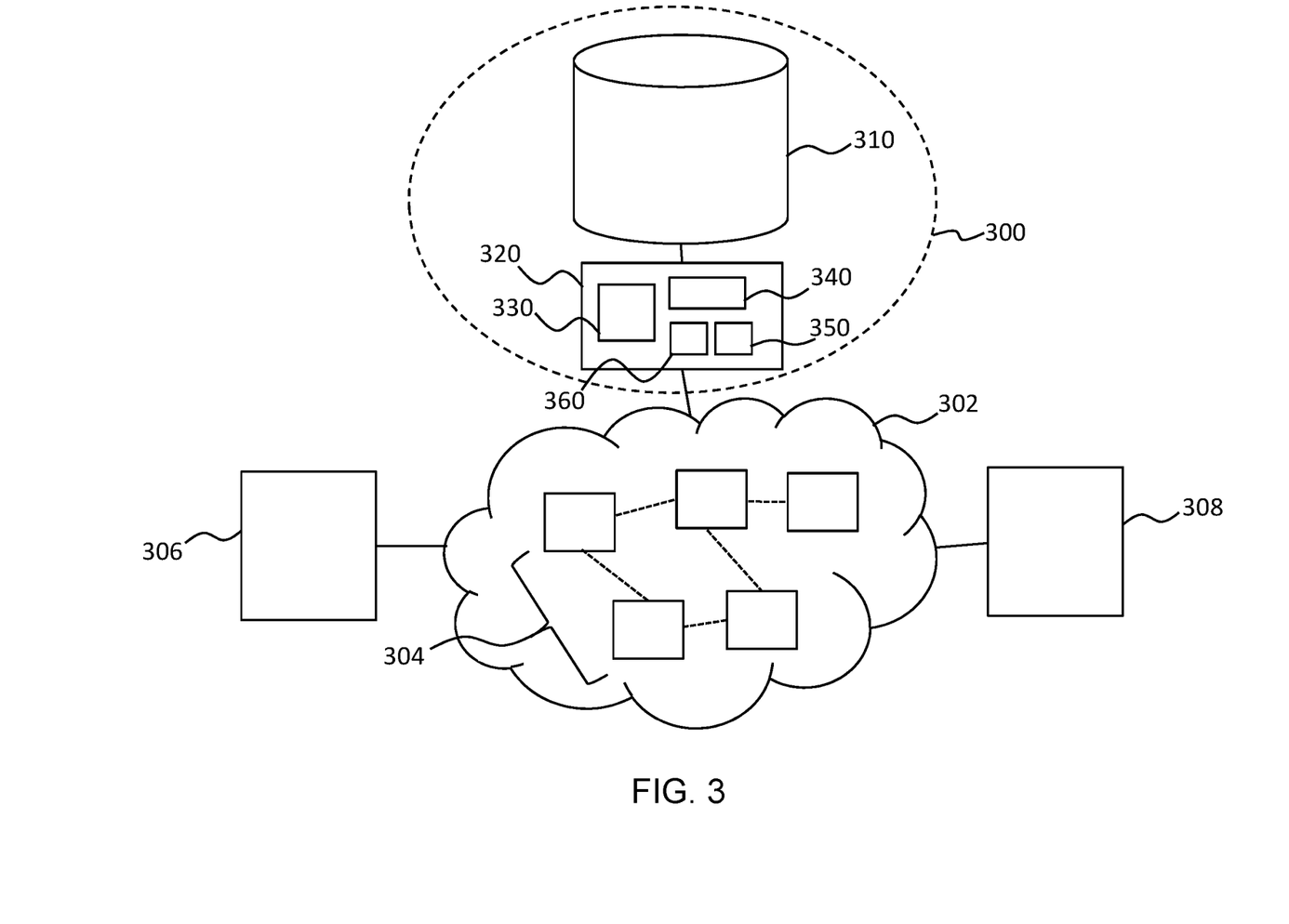
FIG. 3 is a schematic diagram of a computing system which may implement or facilitate implementing event failure management, according to one or more aspects of the present invention.

FIG. 3 is a schematic diagram of a system according to one or more embodiments. The system 300 may be adapted for event failure management within a distributed processing environment including a collection of distributed devices.

As depicted in the example of FIG. 3, the distributed processing environment may include a network 302 (such as a local area network, wide area network, or the Internet) including a collection of components or resources 304 that are connected so as to cooperatively invoke and/or execute applications or services (preferably in a scalable architecture). A consumer 306 (e.g. an application or network device) may access or use an application or service provided by a provider 308 application/device via the network, wherein the components or resources 304 may cooperate so as to invoke and/or execute applications in order for the provider 308 to provide the application or service to the consumer 306.

The system 300 may provide for the prediction or management of event failures when provisioning services and/or applications via the network 302.

The system 300 includes: a failed event database 310 including failed event information relating to failed events and one or more components or resources associated with each of the failed events; and a failed event manager (FEM) 320. By way of example only, failed event information may be as follows:

Failure_id: 001
Failure_message: ConnectionError: Cannot connect to X
Failure_stack: at Sample.method(Sample.java:25)
at Sample.main(Sample.java:9)
Event_id: 034
Event_data: "sample event payload data"
Components: 034, 104, 981

The example above includes a plurality of fields describing characteristics and parameters of the failed event. For example, the failed event information includes: failure identification information; a message for describing the failure; a description of the failure location; event identification information; and event relating to the failure.

By way of example, the FEM 320 includes a processing unit 330 and a data modification unit 340. Upon modification to a component or resource associated with a failed event, the processing unit 330 may be adapted to retry the failed event.

The process of detecting modification to a component or resources associated with a failed event may include monitoring components or resources so as to identify: removal of the component or resource; reconfiguration of the component or resource; reallocation of the component or resource; re-deployment of the component or resource; a change in a use of the component or resource by the associated failed event; or a change in a flow of data to and/or from the component or resource. It is envisioned, however, that the deployment component may be aware of any new deployment or updates to code, or that there may be an Application Programming Interface (API) server for example through which management controls are processed for the environment. Such components may be aware of changes and may be queried and/or may inform the FEM.

By way of example, in retrying the failed event, the processor unit 330 may mark messages associated with the re-tried event with an identifier. The processor unit 330 may then monitor the presence of the identifier (e.g. reported to the FEM 320 by a component) to determine whether retrying the failed event results in event success or event failure by detecting the identifier.

Based on a result of retrying the failed event, the data modification unit 340 updates failed event information of the failed event database 310. For instance, if the retrying of the failed event results in event success, the data modification unit 340 may modify the failed event information based on the event success. Such modification of the failed event information may, for example, include removing, from the failed event database, the failed event information relating to the failed event and the one or more components or resources associated with the failed event. Conversely, if retrying the failed event results in event failure, the data modification unit 340 may leave the failed event information unchanged or may modify the failed event information based on the event failure (e.g. increment a failure counter and/or modify the failed event information to reflect the failure was different and/or for a different/new reason).

It will thus be understood that the system 300 may update and/or maintain information of the failed event database 310 relating to event failures. The process of updating or maintaining the failed event database 310 may be undertaken in response to a component or resource of the processing environment being changed, modified or updated. By retrying a previously failed event when a component or resource changes, the system may identify if the change of component/resource impacts the outcome of the event and, if the outcome does change (e.g. the previously failed event no longer fails), the information of the database may be updated to reflect this change and/or the change of component/resource which resulted in the change. In this way, the failed event database 310 relating to event failures may be dynamically updated so as to ensure that it contains up-to-date and appropriate failed event information for predicting and/or managing event failures.

The system may therefore be used to predict success of an event (due to altered components/resources for example) that may have otherwise been predicted to fail (and thus prevented from executing).

In the example of FIG. 3, the FEM 320 further includes: a database analysis unit 350 and a message handling unit 360.

The database analysis unit 350 may analyze the failed event database 310 to identify a relationship between failed events. The message handling unit 360 may then analyze a message for causing a called event (e.g. from the consumer 306) based on the identified relationship to determine an indicator of expected failure of the called event. Based on the determined indicator of expected failure, the message handling unit 360 may then handle the message in a particular manner that is determined to be most appropriate. For example, the message handling unit 360 may modify the message, prevent the message from being processed by a component or resource associated with the called event, and/or store the message in a message quarantine. In this way, predicted failure of an event due to a message may be managed, mitigated, controlled or avoided by the FEM 320.

Figure 4:
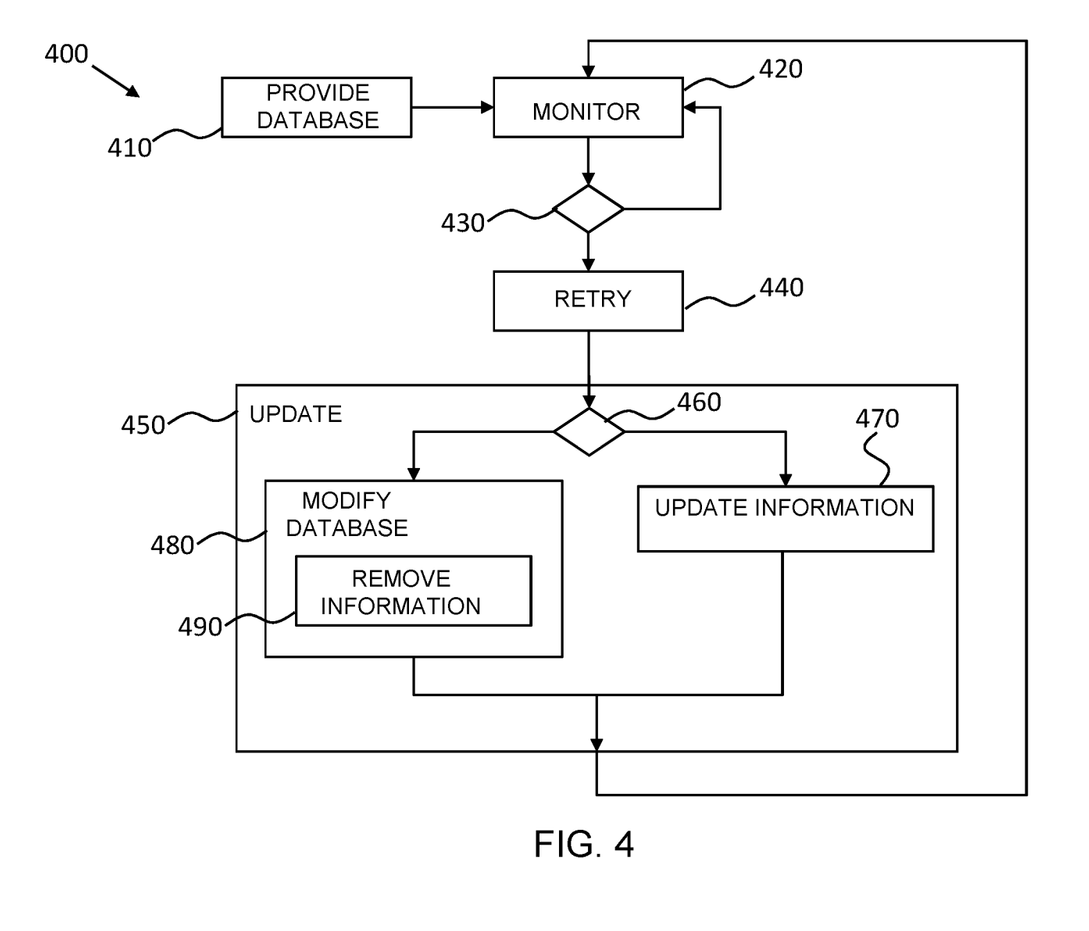
FIG. 4 depicts a flow diagram of a computer-implemented method of event failure management in a distributed processing environment, according to one or more aspects of the present invention.

Referring now to FIG. 4, a flow diagram of one embodiment of a computer-implemented method 400 is provided for event failure prediction or management in a distributed processing environment, according to one or more aspects of the present invention.

The method may begin with step 400 of providing a failed event database including failed event information relating to failed events and one or more components or resources associated with each of the failed events. By way of example, the failed event database may be provided by a remote server or network node which is accessible upon demand (e.g. by communicating a query or request via a communication link and then receiving a response from the provider of the failed event database). Alternatively, or additionally, the failed event database may be provided locally (e.g., within the FEM or within a device implementing the FEM).

As noted, an analysis routine may look for commonality in the failure message and stack, or could look at the event data and could draw commonalities if error stacks are same/same line for code, or if there are common characteristics in the event data, i.e., a common character (% here maybe) or a character from another alphabet, etc. It may also cross reference with the associated components for instance. Failed event information may, for instance, be represented as follows:

Failure_id: 001
Failure_message: ConnectionError: Cannot connect to
Failure_stack: at Sample.method(Sample.java:25)
at Sample.main(Sample.java:9)
Event_id: 034
Event_data: "sample bad % event payload data"
Components: 034, 104, 981

In step 420, the available components and resources of the distributed processing environment are monitored for the purpose of detecting a modification or change in a component or resource. For instance, this may include identifying at least one of: removal of the component or resource; reconfiguration of the component or resource; reallocation of the component or resource; re-deployment of the component or resource; a change in a use of the component or resource by the associated failed event; and a change in a flow of data to and/or from the component or resource. Such monitoring may comprise passive monitoring (e.g. waiting to receive a notification, message, indicator, etc.), active monitoring (e.g. querying, requesting information or response, etc.) or a combination thereof.

The method may check, in step 430, if a modification or change in a component or resource is detected. If no modification or change is detected, the method may return to step 420 to continue monitoring for modification of a component or resource. If a modification or change is detected, the method may proceed to step 440 wherein a failed event (e.g. an event associated with the modified component or resource) is retried.

For example, the step 440 of retrying the failed event may include marking messages associated with the re-tried event with an identifier (or adding metadata to the event) and subsequently monitoring the presence of the identifier at a FEM or component to determine whether the retrying of the failed event results in event success or event failure (e.g. by detecting presence of the identifier at the FEM). In this way, an identifier or metadata may be introduced as a form of tracking element so that, if it shows up in the FEM again, its detected presence can be used to identify that the failure is still present or persists.

Embodiments may include marking the re-tried event with an identifier. Components may monitor for events with such additional metadata or identifier. If, for example, an event failed within ComponentB and it was retried. When ComponentB is processing the event it will identify it as a replayed event due to the presence of the metadata and if ComponentB processes it successfully, or it makes it past the point it failed last time then ComponentB may notify the FEM.

Based on a result of retrying the failed event, failed event information of the failed event database may be updated in step 450.

By way of example, the flow diagram of FIG. 4 illustrates an example of the step 450 (of updating the failed event database) in more detail. Here, the step 450 of updating failed event information may include identifying, in step 460, if the result of retrying the failed event was failure or success.

If, in step 460, it is identified that retrying the failed event resulted in event failure, then the method may proceed to step 470, wherein the failed event information of the failed event database may be left unchanged or may be updated to reflect the failure. For example, if the event failed for a different reason and/or a counter of retry attempts is maintained, the failed event information may be updated to reflect this. Thus, it may be determined that the detected modification or change in resource(s)/component(s) still results in failure of the event, thereby having little to no impact on the failed event (e.g. not changing the expected failure of the event to success). In this way, it may be determined that the failed event information need not be changed or needs to be modified to reflect the detected change in resource(s)/component(s) which still results in event failure. After completing step 470, the method may return to step 420 to continue/repeat the process of monitoring for further modification of a component or resource If, in step 460, it is identified that retrying the failed event resulted in event success, then the method may proceed to step 480, wherein the failed event information of the failed event database may be modified based on the event success. For instance, the step 480 of modifying the failed event database may include the step 490 of removing, from the failed event database, the failed event information relating to the failed event and/or the component(s) or resource(s) associated with the (now successful) event. Thus, it may be determined that the detected modification or change in resource(s)/component(s) no longer results in failure of the event, thereby requiring a change to information relating to the event (e.g. changing the expected failure of the event to success by removing information about the event and/or the associated resource(s)/component(s) from the failed event database). In this way, it may be determined that the failed event information needs to be changed or modified to reflect the detected change in resource(s)/component(s). After completing step 480, the method may return to step 420 to continue/repeat the process of monitoring for further modification of a component or resource It will thus be understood that the method of FIG. 4 may continually/repeatedly monitor available resource(s)/component(s) and dynamically update or maintain the failed event database in order to store up-to-date information about predicted or expected failed events.

One or more embodiments disclosed herein may therefore also include analyzing the failed event database to identify a relationship between failed events. Based on the identified relationship, a message in the distributed processing environment (such as service and/or application requests, for example) may be received (e.g. intercepted, captured, diverted, received or the like) and analyzed so as to determine an indicator of expected failure of an event. The message may then be handled based on the determined indicator of expected failure. For instance, such handling may comprise: modifying the message; preventing the message from being processed by a component or resource associated with the called event; and/or storing the message in a message quarantine. In this way, event failure may be managed, mitigated, avoided or controlled in accordance with dynamically maintained and up-to-date information of a database.

In one or more embodiments, a computer program is provided adapted to carry out a method as previous described, with reference to FIGS. 1 to 4.

In some embodiments, there may be provided a system comprising a processing arrangement adapted to carry out any method previously described with reference to FIGS. 1-4.

Figure 5:
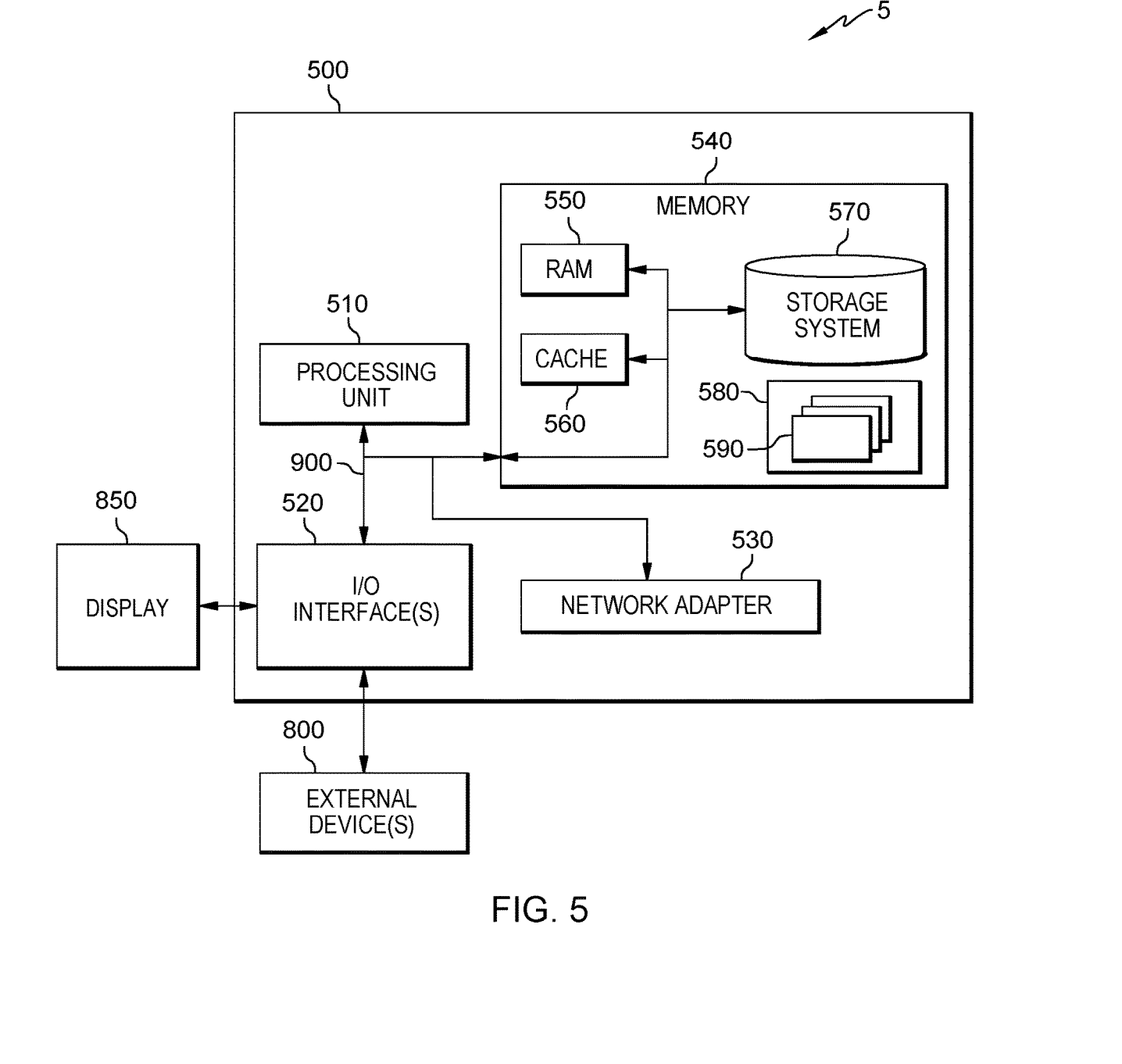
FIG. 5 illustrates a system for event failure management, according to one or more aspects of the present invention.

By way of example, as illustrated in FIG. 5, embodiments may comprise a computer system 500, which may form part of a networked system 5. The components of computer system/server 500 may include, but are not limited to, one or more processing arrangements, for example comprising processors or processing units 510, a system memory 540, and a bus 900 that couples various system components including system memory 540 to processing unit 510.

Bus 900 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 500 typically includes a variety of computer system readable media. Such media may be any available media that is accessible by computer system/server 500, and it includes both volatile and non-volatile media, removable and non-removable media.

System memory 540 can include computer system readable media in the form of volatile memory, such as random access memory (RAM) 550 and/or cache memory 560 and/or another suitably adapted storage system 570. Computer system/server 500 may further include other removable/non-removable, volatile/non-volatile computer system storage media. By way of example only, storage system 540 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 900 by one or more data media interfaces. As will be further depicted and described below, memory 540 may include at least one program product having a set (e.g., at least one) of program modules that are configured to carry out the functions of embodiments of the invention.

Program/utility 580, having a set (at least one) of program modules 590, may be stored in memory 540 by way of example, and not limitation, as well as an operating system, one or more application programs, other program modules, and program data. Each of the operating system, one or more application programs, other program modules, and program data or some combination thereof, may include an implementation of a networking environment. Program modules 590 generally carry out the functions and/or methodologies of embodiments of the invention as described herein.

Computer system/server 500 may also communicate with one or more external devices 800 such as a keyboard, a pointing device, a display 850, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 520. Still yet, computer system/server 500 can communicate with one or more networks such as a local area network (LAN), a general wide area network (WAN), and/or a public network (e.g., the Internet) via network adapter 530. As depicted, network adapter 530 communicates with the other components of computer system/server 500 via bus 900. It should be understood that although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that not all embodiments of the invention may have all above described potential advantages, and described advantages are not necessarily required of all embodiments. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for event failure management, the method comprising:
    providing a failed event database comprising failed event information relating to failed events and one or more components or resources associated with each of the failed events;
    upon modification to a component or resource associated with a failed event, retrying the failed event;
    based on a result of retrying the failed event, updating failed event information of the failed event database;
    analyzing the failed event database to identify a relationship between failed events;
    based on the identified relationship, intercepting and analyzing a message from a client, wherein the message initiates a called event, wherein an event comprising the called event earlier resulted in a failed event in the failed event database, to determine an indicator of expected failure of the called event; and
    handling the message based on the determined indicator of expected failure, wherein handling the message comprises:
        modifying the message and enabling the modified message to be processed by the component or the resource associated with the called event; and
        storing the message in a message quarantine.

2. The method of claim 1, wherein the updating failed event information comprises:
    based on retrying the failed event resulting in event success, modifying the failed event information based on the event success; and
    based on retrying the failed event resulting in event failure, either leaving the failed event information unchanged or modifying the failed event information based on the event failure.

3. The method of claim 2, wherein the modifying the failed event information comprises:
    removing, from the failed event database, the failed event information relating to the failed event and the one or more components or resources associated with the failed event.

4. The method of claim 1, wherein the retrying the failed event comprises:
    marking the re-tried event with an identifier; and
    monitoring the presence of the identifier at a failed event manager or component to determine whether retrying the failed event results in event success or event failure by detecting the identifier.

5. The method of claim 1, further comprising:
    detecting modification to a component or resource associated with a failed event by identifying at least one of:
    removal of the component or resource;
    reconfiguration of the component or resource;
    reallocation of the component or resource;
    re-deployment of the component or resource;
    a change in a use of the component or resource by the associated failed event; and
    a change in a flow of data to or from the component or resource.

6. A computer program product for event failure management, the computer program product comprising a computer readable storage medium having program instructions embodied therewith, the program instructions being executable by a processing unit to cause the processing unit to perform a method comprising:
  providing a failed event database comprising failed event information relating to failed events and one or more components or resources associated with each of the failed events;
  upon modification to a component or resource associated with a failed event, retrying the failed event;
  based on a result of retrying the failed event, updating failed event information of the failed event database;
  analyzing the failed event database to identify a relationship between failed events;
  based on the identified relationship, intercepting and analyzing a message from a client, wherein the message initiates a called event, wherein an event comprising the called event earlier resulted in a failed event in the failed event database, to determine an indicator of expected failure of the called event; and
  handling the message based on the determined indicator of expected failure, wherein handling the message comprises:
    modifying the message and enabling the modified message to be processed by the component or the resource associated with the called event; and
    storing the message in a message quarantine.

7. The computer program product of claim 6, wherein the updating failed event information comprises:
  based on retrying the failed event resulting in event success, modifying the failed event information based on the event success; and
  based on retrying the failed event resulting in event failure, either leaving the failed event information unchanged or modifying the failed event information based on the event failure.

8. The computer program product of claim 7, wherein the modifying the failed event information comprises:
  removing, from the failed event database, the failed event information relating to the failed event and the one or more components or resources associated with the failed event.

9. The computer program product of claim 6, wherein the retrying the failed event comprises:
  marking the re-tried event with an identifier; and
  monitoring the presence of the identifier at a failed event manager or component to determine whether retrying the failed event results in event success or event failure by detecting the identifier.

10. The computer program product of claim 6, further comprising:
  detecting modification to a component or resource associated with a failed event by identifying at least one of:
  removal of the component or resource;
  reconfiguration of the component or resource;
  reallocation of the component or resource;
  re-deployment of the component or resource;
  a change in a use of the component or resource by the associated failed event; and
  a change in a flow of data to or from the component or resource.

11. A system for event failure management, the system comprising:
  a memory; and
  at least one processor communicatively coupled to the memory, wherein the system performs a method comprising:
    providing a failed event database comprising failed event information relating to failed events and one or more components or resources associated with each of the failed events;
    upon modification to a component or resource associated with a failed event, retrying the failed event;
    based on a result of retrying the failed event, updating failed event information of the failed event database
    analyzing the failed event database to identify a relationship between failed events;
    based on the identified relationship, intercepting and analyzing a message from a client, wherein the message initiates a called event, wherein an event comprising the called event earlier resulted in a failed event in the failed event database, to determine an indicator of expected failure of the called event; and
    handling the message based on the determined indicator of expected failure, wherein handling the message comprises:
      modifying the message and enabling the modified message to be processed by the component or the resource associated with the called event; and
      storing the message in a message quarantine.

12. The system of claim 11, wherein the updating failed event information comprises:
  based on retrying the failed event resulting in event success, modifying the failed event information based on the event success; and
  based on retrying the failed event resulting in event failure, either leaving the failed event information unchanged or modifying the failed event information based on the event failure.

13. The system of claim 12, wherein the modifying the failed event information comprises:
  removing, from the failed event database, the failed event information relating to the failed event and the one or more components or resources associated with the failed event.

14. The system of claim 11, wherein the retrying the failed event comprises:
  marking the re-tried event with an identifier; and
  monitoring the presence of the identifier at a failed event manager or component to determine whether retrying the failed event results in event success or event failure by detecting the identifier.

15. The system of claim 11, further comprising:
  detecting modification to a component or resource associated with a failed event by identifying at least one of:
  removal of the component or resource;
  reconfiguration of the component or resource;
  reallocation of the component or resource;
  re-deployment of the component or resource;
  a change in a use of the component or resource by the associated failed event; and
  a change in a flow of data to or from the component or resource.

* * * * *